United States Patent [19]
Corliss

[11] Patent Number: 5,427,878
[45] Date of Patent: Jun. 27, 1995

[54] SEMICONDUCTOR WAFER PROCESSING WITH ACROSS-WAFER CRITICAL DIMENSION MONITORING USING OPTICAL ENDPOINT DETECTION

[75] Inventor: Daniel A. Corliss, Leominster, Mass.

[73] Assignee: Digital Equipment Corporation

[21] Appl. No.: 243,558

[22] Filed: May 16, 1994

Related U.S. Application Data

[63] Continuation of Ser. No. 721,193, Jun. 26, 1991, abandoned.

[51] Int. Cl.$^6$ ............................................... G03F 7/26
[52] U.S. Cl. ........................................ 430/30; 430/311; 356/382; 356/436; 356/442; 356/443
[58] Field of Search .................... 430/30, 311, 325; 156/626, 643; 204/192.13, 192.33, 298.32; 250/573; 356/345, 357, 381, 382, 436, 442, 443

[56] References Cited

U.S. PATENT DOCUMENTS

| | | | |
|---|---|---|---|
| 4,356,055 | 10/1982 | Montier | 156/626 |
| 4,493,745 | 1/1985 | Chen et al. | 156/626 |
| 4,611,919 | 9/1986 | Brooks | 356/357 |
| 4,647,172 | 3/1987 | Batchelder | 430/30 |
| 4,851,311 | 7/1989 | Millis | 430/30 |
| 4,953,982 | 9/1990 | Ebbing | 356/357 |
| 4,954,212 | 9/1990 | Gabriel et al. | 156/627 |
| 4,998,021 | 3/1991 | Mimasaka | 250/260 |

FOREIGN PATENT DOCUMENTS

0352004A2 1/1990 European Pat. Off. .

OTHER PUBLICATIONS

Grindle: "Photoresist Characterization Using Interferometry During Development", Proc. 4th Annual Test & Meas. World Expo, San Jose, Calif., May 1985.
Thomson, "In-situ Develop End Point Control to Eliminate CD Variance", SPIE Proc. of Integrated Circuit Metrology, Inspection & Proc. Control, San Jose, Calif., Mar. 1990.
Uhler, "Automatic Linewidth Control System", SPIE Proc. of Integrated Circuit Metrology, Inspection and Process Control, San Jose, Calif., 1987.
Sautter et al, "Development Process Control and Optimization Utilizing an End Point Monitor", KTI Interface '88 Proceedings, pp. 99–111.

Primary Examiner—Marion E. McCamish
Assistant Examiner—Kathleen Duda
Attorney, Agent, or Firm—Arnold, White & Durkee

[57] ABSTRACT

A method for across-wafer critical dimension uniformity performance monitoring in the manufacture of semiconductor devices employs a number of optical endpoint detectors at sites at the wafer face which are spaced across the wafer face. Each optical endpoint detector is able to directly measure the end point of the process step at its site. One of these optical endpoint detectors is used to control the process, and when the endpoint has been reached for this site the process completion time is predicted and this completion time is used to control the processing equipment. For example, if the process step being monitored is the development of photoresist, then the developing operation is ended based upon this calculated completion time derived from the detected endpoint for the control site. The other sites are used to monitor across-wafer performance. The output of each of these other optical detectors is used to determine the endpoint for each monitor site, and these endpoints are compared with the control endpoint to determine across-wafer critical dimension performance and conformance to specification. The wafers can thus be flagged if out-of-limit, and need not be processed through subsequent steps.

7 Claims, 3 Drawing Sheets

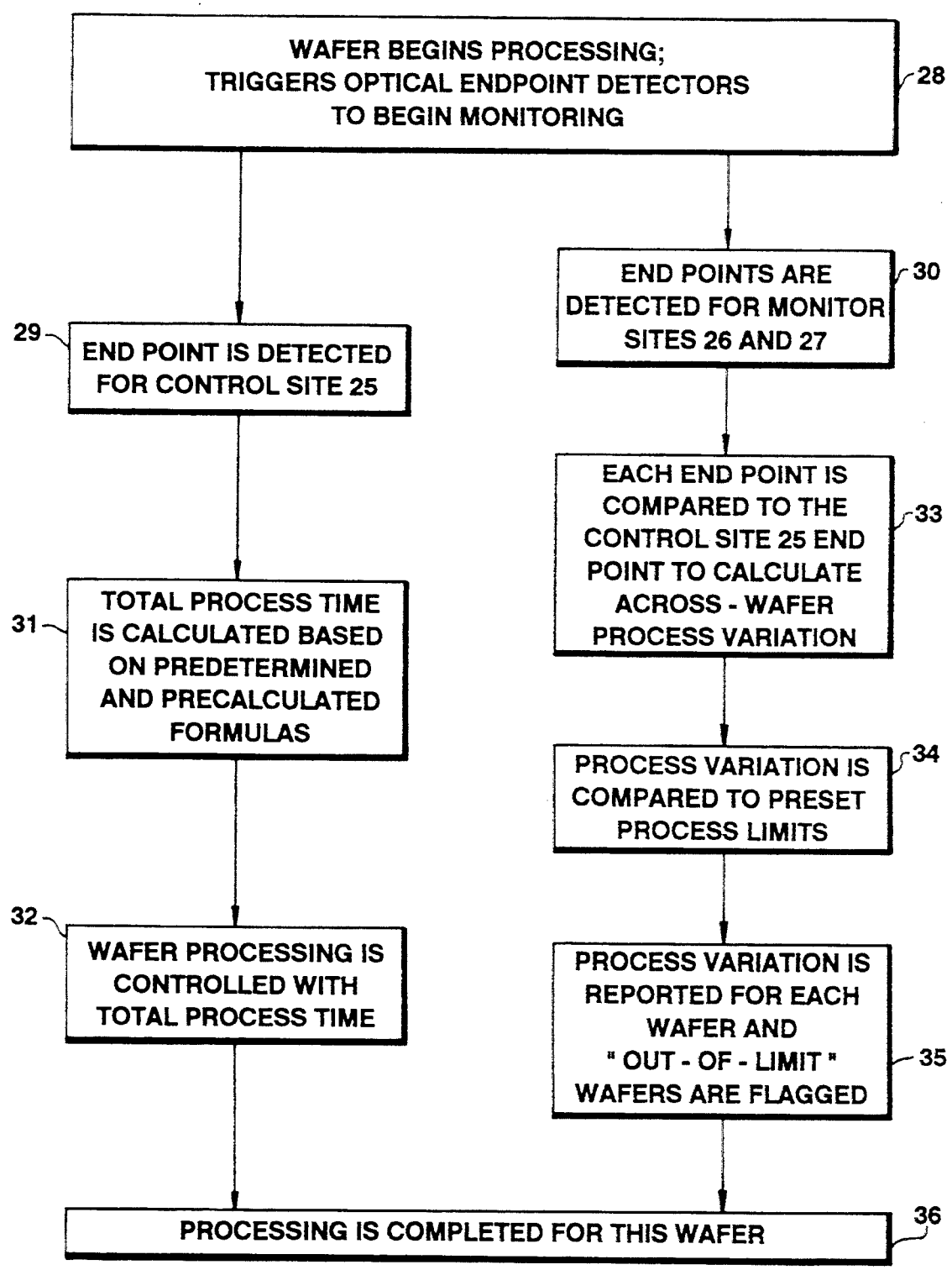

SEMICONDUCTOR WAFER PROCESSING WITH ACROSS-WAFER CRITICAL DIMENSION MONITORING USING OPTICAL ENDPOINT DETECTION

This application is a continuation of application Ser. No. 721,193, filed Jun. 26, 1991 (now abandoned).

BACKGROUND OF THE INVENTION

This invention relates to methods of manufacture of semiconductor integrated circuit devices, and more particularly to a method of determining across-wafer critical dimension uniformity performance during wafer processing, using optical endpoint detection.

In the manufacture of VLSI devices, critical dimension uniformity is crucial to the overall electrical performance of the devices being made. If the nominal line width for a transistor gate or the like is 0.5 micron, then the actual line width in the finished device should be exactly that, and should be the same for all devices within a wafer, and all wafers within a lot. Variations in critical dimension uniformity are excursions from the desired process, and cause reductions in chip manufacturing efficiency (yield) and in final chip performance. Thus, in the semiconductor industry a very important factor is the monitoring and controlling of critical dimension uniformity.

The ability to determine critical dimension uniformity performance previously has been restricted to direct measurement systems (i.e., scanning electron microscopes or SEMs, optical microscopes, electrical probers, etc.), all of which required significant additional process time. Due to this added process time, typically only a sample of measurements were (and still are) performed to determine wafer-to-wafer, lot-to-lot, and across-wafer critical dimension performance. As a result, most wafers were processed and transferred on to the next process step without having their critical dimension performance determined. This lack of 100% critical dimension determination allows potentially out-of-specification wafers to be transferred on, only to be scrapped for poor electrical performance at final wafer probe. This significantly adds to the inefficiency and cost of chip manufacturing.

An optical end point detector (OEPD) has been developed to monitor and control wafer-to-wafer and lot-to-lot critical dimension uniformity performance. The technology of optical endpoint detectors is described in the following publications: (1) S. Grindle and E. Pavelcheck, "Photoresist Characterization Using Interferometry During Development," Proceedings of the 4th Annual Test and Measurement World Expo, San Jose, Calif., 14-16 May 1985; (2) M. Thomson, "In-situ Develop End Point Control to Eliminate CD Variance," SPIE Proceedings of Integrated Circuit Metrology, Inspection, and Process Control IV, San Jose, Calif., 5-6 Mar. 1990; (3) K. M. Sautter, M. Ha, and T. Batchelder, "Development Process Control and Optimization Utilizing an End Point Monitor," KTI Interface '88 Proceedings; and (4) L. J. Uhler, "Automatic Linewidth Control System," SPIE Proceedings of Integrated Circuit Metrology, Inspection, and Process Control, San Jose, Calif., 1987. These optical endpoint detectors operate by directing a source of light at single area of developing photoresist, and observing interference patterns caused by the light reflecting from the top of the photoresist and also from the substrate. This equipment has provided much-improved monitoring and control of critical dimension uniformity.

However, even with use of optical endpoint detectors, across-wafer critical dimension performance is still an unknown, such that direct measurement systems are still required. It is proposed herein to enhance the wafer-to-wafer and lot-to-lot technique by providing the capability to monitor across-wafer critical dimension uniformity performance by simultaneously monitoring multiple sites across a wafer for optical endpoint detections.

If across-wafer critical dimension uniformity performance could be provided, a number of benefits would be realized: (1) the capability to determine across-wafer critical dimension performance in-situ for all wafers processed rather than for only sample wafers; (2) the reduction or elimination of out-of-specification wafers being transferred on to later process steps undetected; (3) the reduction or elimination of after-process direct critical dimension measurements using SEMs or the like; (4) an increase in chip manufacturing efficiency; and (5) a decrease in chip manufacturing cost.

It is proposed, therefore, to provide a way of allowing the determination of across-wafer critical dimension uniformity performance during the actual processing of the wafer, rather than after the processing is completed. Also this information should be determined for every wafer processed, not just samples, without requiring direct critical dimension measurement. This would increase overall efficiency of wafer processing by reducing total inspection time through selective inspection of flagged wafers, as well as the reduction or elimination of after-process critical dimension measurements. Also, this would enable the reduction of capital expenditures for critical dimension measurement systems.

Currently, the ability to determine across-wafer critical dimension uniformity performance is limited to direct measurements taken after processing is completed. No currently used equipment allows determination of across-wafer critical dimension uniformity performance while the wafer is being processed. Also, while the optical endpoint detectors such as discussed in the publications referred to above have the ability to predict and control wafer-to-wafer and lot-to-lot critical dimensions, they do not maintain the capacity to predict across-wafer critical dimension uniformity performance. Therefore, with current technology, prior to this invention, there is no capability for across-wafer critical dimension uniformity performance determination using optical endpoint detectors.

SUMMARY OF THE INVENTION

In accordance with one embodiment of the invention, a method for across-wafer critical dimension uniformity performance monitoring in the manufacture of semiconductor devices employs a number of optical endpoint detectors at sites across the wafer face. One of these optical endpoint detectors is used to control the process, and when the endpoint has been reached for this site the process completion time is calculated and this completion time is used to control the processing equipment. For example, if the process step being monitored is the development of photoresist, then the developing operation is ended based upon this calculated completion time derived from the detected endpoint for the control site. The other sites are used to monitor across-wafer performance. The output of each of these other optical detectors is used to determine the endpoint for each monitor site, and these endpoints are compared with the control endpoint to determine across-wafer critical dimension performance and conformance to specification. The wafers can thus be flagged if out-of-limit, and need not be processed through subsequent steps.

BRIEF DESCRIPTION OF THE DRAWINGS

The novel features believed characteristic of the invention are set forth in the appended claims. The invention itself, however, as well as other features and advantages thereof, will be best understood by reference to the detailed description of specific embodiments which follows, when read in conjunction with the accompanying drawings, wherein:

FIG. 5 is a flow chart of a method of processing semiconductor wafers according to one embodiment of the invention.

DETAILED DESCRIPTION OF SPECIFIC EMBODIMENT

Figure 1:
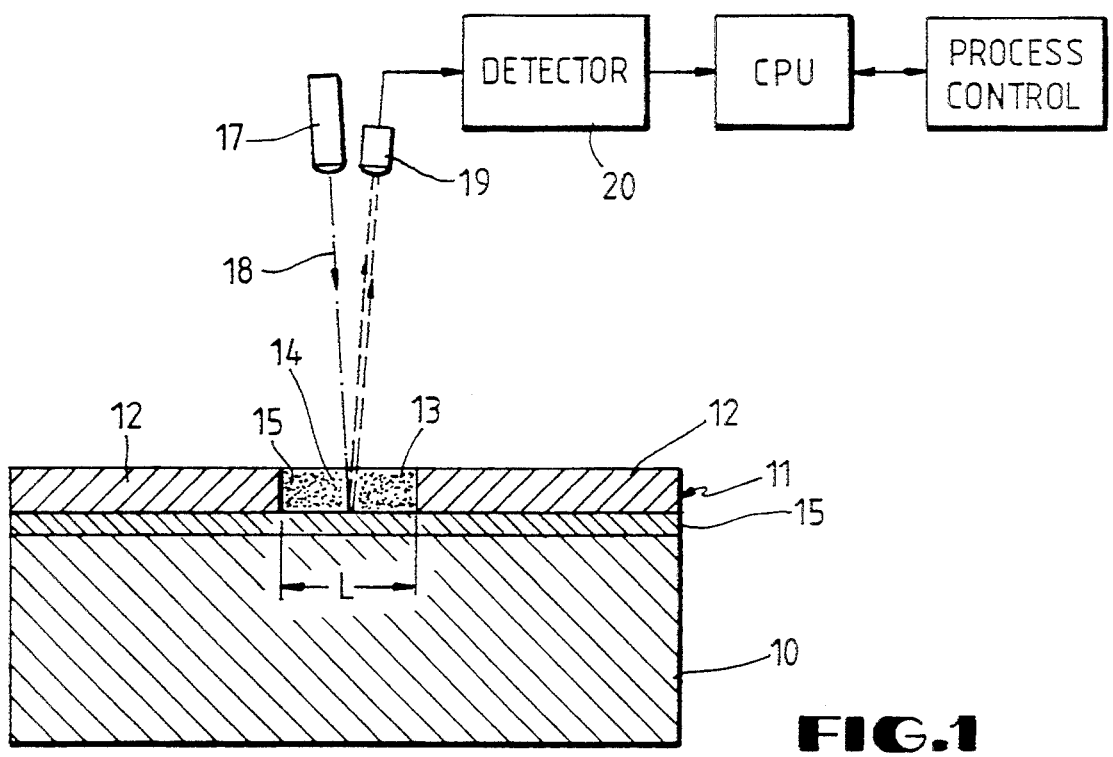
FIG. 1 is a diagram of an optical endpoint detector mechanism which may be used in the method of the invention.
Figure 2A:
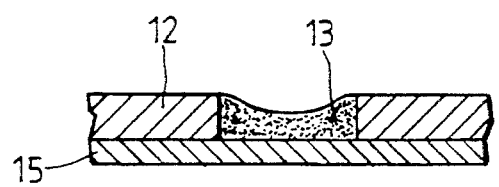
FIGS. 2a-2c are elevation views in section of a small part of a semiconductor wafer as seen in FIG. 1, at successive stages in a photoresist developing process.
Figure 2B:
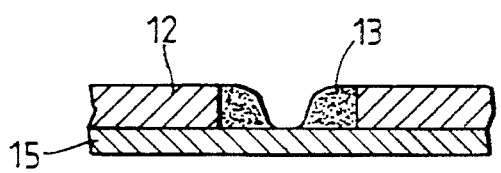
Figure 2C:
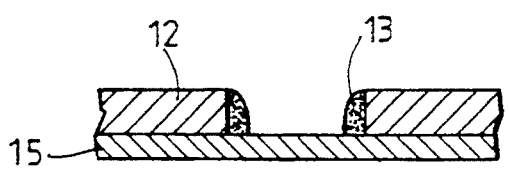

Referring to FIG. 1, an optical endpoint detection mechanism is illustrated which may be used in the method of the invention. A small part of a semiconductor wafer 10 is shown having a coating of photoresist 11 thereon, it being understood that this general structure of the wafer is repeated many hundreds of thousands of times in a wafer of several inches in diameter, the part shown being only a few microns wide. This coating 11 has been exposed to light through a mask to define some desired pattern, leaving unexposed portions 12 and exposed portion 13. After exposing, the resist is developed by subjecting the wafer to a developing solution which serves to dissolve the exposed portion 13 of the photoresist, leaving the unexposed photoresist portions 12 in place to be subsequently used as a mask for an operation such as etching an underlying layer 14 of oxide, nitride, polysilicon or metal, for example, or used as an implant mask. The optics of the exposure to light are such that the central portion 14 of the portion 13 is exposed heavier and thus will develop faster than portions 15 closer to the edges of the portion 13. The nominal linewidth L may be, for example, 0.5 micron, but the actual linewidth of the resultant photoresist mask may be less than or more than 0.5 micron, depending upon the exposure optics, the development rate, how long the wafer stays in the developer, and various process parameters. As illustrated in FIGS. 2a-2c, the development (hence removal) of the area 13 of photoresist proceeds first in the center where it is exposed the most, reaching the underlying substrate in FIG. 2b, then proceeding to remove the sidewalls proceeding toward the periphery. If the wafer stays in the developer long enough, the photoresist will be removed up to and even passed the edge between the exposed and unexposed portions. The objective, of course, is to achieve a consistent and predictable linewidth, and it is for this reason that the optical endpoint detection mechanism is needed. Without endpoint detection, it would be necessary to predict the developing time based upon empirical data, then adjust the time for subsequent batches after completing the wafer fabrication process and making mechanical measurements of the linewidths for known developing times.

The optical endpoint detection mechanism of FIG. 1 uses a monochromatic light source 17 generating a beam 18 which is reflected off the upper surface of the photoresist 13 and also off the underlying substrate to produce two interfering beams reaching a photodetector 19. An interferogram is thus produced by a processor or CPU from the output of a detector 20, and this interferogram may be of the form illustrated in FIG. 3 (which is merely one example of the type of output produced), where the detected intensity is plotted as a function of developing time in a graph 21. It is seen that the interference pattern in this example changes as the development proceeds through the shapes of the portion 13 of FIGS. 1, 2a, 2b and 2c, until the portion 13 is removed down to the substrate, where a constant intensity is produced as indicated by the line 22. By monitoring the output of the photodetector 19 while the wafer is subjected to the developer, a real-time measure of the actual removal of photoresist is provided, and so a more accurate endpoint can be detected and used to decide when to remove the wafer from the developer, e.g., by process controller equipment under control of the CPU.

The development process can be considered to be divided into two components, one vertical ($t_c$) to the wafer surface, and one lateral ($\alpha t_c$) to the wafer surface. The vertical time is while the central portion 14 is being removed as in FIG. 2a, up until the photoresist has cleared the central area, and the lateral portion is while the sidewalls are being removed as in FIG. 2c. The total development time $t_d$ can be expressed $$t_d = t_c + \alpha t_c$$

The factor $\alpha$ is a function of exposure change, diffraction properties of the lens, and reaction mechanics of the develop process. The vertical component $t_c$ is measurable in real time as discussed, using the detector of FIG. 1, while the lateral component is predictable based upon $t_c$ and empirical data. Therefore a real-time feedback control is provided. An algorithm is selected based on these relationships to stop the develop cycle while the wafer is being processed, producing much greater linewidth control than previously possible.

Figure 3:
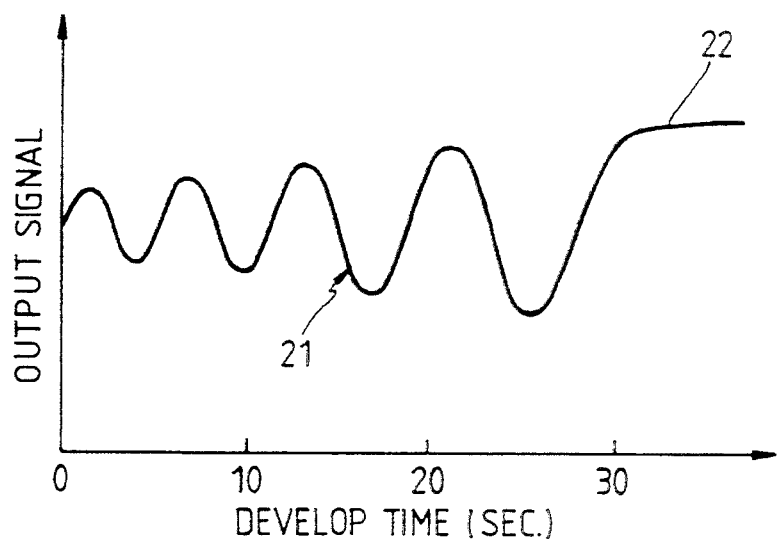
FIG. 3 is a timing diagram showing detector output appearing in the mechanism of FIG. 1, plotted as a function of time, for one example of a type of detector output.

Optical endpoint detection as illustrated in FIGS. 1-3 has been used to monitor a single wafer site to determine process end point to thereby predict and control wafer-to-wafer and lot-to-lot critical dimension performance. These applications are limited to predicting process performance of that single wafer site and cannot predict across-wafer performance. Since process reaction rates have occurrence to vary in an across-wafer format, as well as wafer-to-wafer and lot-to-lot, it is therefore beneficial to determine (and possibly to control) across-wafer process performance in order to improve the efficiency of manufacturing. According to the invention, across-wafer critical dimension uniformity performance is determined by monitoring multiple wafer sites.

Figure 4:
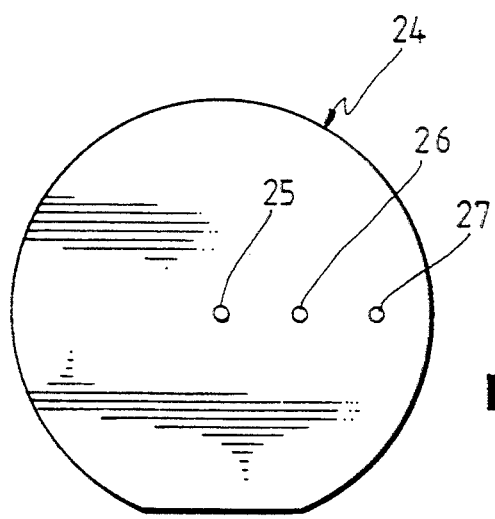
FIG. 4 is a plan view of a semiconductor wafer having multiple optical endpoint detectors, according to one example embodiment of the invention, for across-wafer monitoring.

Referring to FIG. 4, a wafer 24 being processed as in FIG. 1 is monitored at sites 25, 26, and 27, each monitoring site having an optical endpoint detector as in FIG. 1 including a light source 17 and photodetector 19, along with a detector 20, feeding inputs to the CPU. One of these sites, e.g., the central site 25, is used to monitor and control the wafer process using the process controller, just as discussed above. The remaining sites 26 and 27 are used to determine across-wafer critical dimension uniformity performance. Referring to FIG. 5, a flow chart depicting the sequence is illustrated. The two paths of FIG. 5 are parallel paths being processed at the same time, rather than being independent.

The processing of the wafer begins when the development of the photoresist is started, indicated by the block 28 of FIG. 5, triggering the optical endpoint detectors of FIG. 1 to begin monitoring, producing the outputs of FIG. 3. In the control path, the endpoint is detected at block 29, i.e., the photoresist is removed all the way to the substrate, indicated by the flat line 22 of FIG. 3 being reached. Meanwhile, the endpoints are detected for the other monitor sites 26 and 27 as indicated by the block 30; these may be the same as, or earlier, or later, than the control path. The total process time is calculated for the control path, indicated by the block 31, based upon formulas which are precalculated using empirical data, as for the factor α. Then the wafer processing is controlled using the result of block 31 to define the total process time, i.e., when the developer is stopped, indicated by the block 32. In the monitor path, as indicated by the block 33, the end points for each of the monitoring sites 26 and 27 (from block 30) are compared to the end point detected from the control site 25 (from block 29) to determine the across-wafer process variations. Each of these across-wafer variations is then compared to preset process limits as indicated by the block 34, and the process variation is reported for each wafer, and if limits are exceeded the out-of-limit wafers are flagged as indicated by the block 35. The processing for this wafer is completed as indicated by the block 36.

Since optical endpoint detection is an accurate predictor of the final wafer critical dimension, the multiple monitor sites can be readily compared to the "known critical dimension" control site 25 to determine process variation or across-wafer critical dimension uniformity performance. This information is then used for (1) wafer discrimination during lot processing, in which wafers can be sorted according to critical dimensions, (2) process stability monitoring, in which the performance of the process with time is monitored, (3) replacement of some or all direct critical dimension measurements previously required, and (4) development of process technology to stabilize across-wafer variations.

By employing the method of the invention, in place of current technologies, for determining across-wafer critical dimension uniformity performance, several benefits are realized. First, there is determination of critical dimension uniformity performance in 100% of the wafers, rather than only selected test wafers, so the wafer scrap at final wafer probe is thereby reduced, because wafers out of limits will not be processed through the remainder of the process. second, there is a reduction of (and possibly the elimination of) direct critical dimension measurement requirements (as by SEMs, etc.) so the wafer processing throughput is increased, while also reducing the capital expenditures required for direct critical dimension measurement equipment (which can be in the range of $600,000 to well over $1-Million).

Third, in-situ across-wafer process variation diagnostics are provided that reduce the time required for development of process technology that improves the across-wafer performance. Fourth, an overall increase in the efficiency of wafer process development and manufacturing is provided.

Although described above in reference to using the method of the invention in the context of developing a photoresist coating 11, it is understood that the features of the invention are useful as well in across-wafer critical dimension monitoring for other materials used in semiconductor manufacture. For example, the method of the invention may be used in monitoring critical dimension performance for oxide coatings, polysilicon or silicon layers, silicon nitride layers, or metallization layers. In these situations, it is the etching of this material that is being monitored for endpoint, rather than developing. If the material is not transparent to the beam 18, the endpoint may be detected by a peak in the detector output, for example, The characteristic detector output as the etching of the layer progresses may be a rising or falling level, followed by a peak or flat region when the underlying material is reached.

While this invention has been described with reference to specific embodiments, this description is not meant to be construed in a limiting sense. Various modifications of the disclosed embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A method of determining critical dimension uniformity in the processing of a semiconductor wafer in a process having a first process stage and having subsequent second processing stages, comprising the steps of:
   a) at said first process stage, detecting the progress of removal of a coating on a face of a wafer by each of a plurality of separate optical endpoint detectors of like construction positioned at different sites spaced across said face, one of said detectors being a control detector and at least one of said detectors being a monitor detector, the detectors having separate light sources and separate sensors;
   b) determining a control process completion time for said first process stage from an output of said control detector, and terminating said first process stage by ceasing removal of said coating at said completion time;
   c) determining a monitor process completion time for said first process stage from an output of each said monitor detector;
   d) comparing said monitor process completion time with said control process completion time to determine differences in said process completion times revealed by said step of comparing.

2. A method according to claim 1 wherein there are at least two of said monitor detectors, and a monitor process completion time is determined for each of said monitor detectors.

3. A method according to claim 1 wherein said coating is photoresist and said removal is developing of said photoresist.

4. A method according to claim 3 wherein said step of detecting includes directing a source of monochromatic light at an area of photoresist being developed, and observing interference patterns in light reflected from the surface of the photoresist and from the face of the wafer beneath the photoresist.

5. A method of manufacturing a semiconductor device in a process having a first process stage and having subsequent second processing stages, comprising the steps of:
   a) in said first process stage, applying a coating of photoresist to a face of a semiconductor substrate, and exposing said face to radiation through a mask to define a pattern;
   b) applying a developer to said face to develop said photoresist;
   c) detecting the progress of developing said photoresist by each of a plurality of separate optical endpoint detectors of like construction positioned at different sites spaced across said face, one of said detectors being a control detector and at least one of said detectors being a monitor detector, the detectors having separate light sources and separate sensors;
   d) determining a control process completion time for said first process stage from an output of said control detector, and terminating said first process stage by ceasing said step of applying developer, based upon said completion time;
   e) determining a monitor process completion time for said first process stage from an output of each said monitor detector;
   f) comparing said monitor process completion time with said control process completion time to determine differences in said process completion times revealed by said step of comparing.

6. A method according to claim 5 wherein there are at least two of said monitor detectors, and a monitor process completion time is determined for each of said monitor detectors.

7. A method according to claim 5 wherein said step of detecting includes directing a beam of monochromatic light at an area of photoresist being developed, and observing interference patterns in light reflected from the surface of the photoresist and from the face of the wafer beneath the photoresist.

* * * * *